US006676196B1

(12) United States Patent
Smith

(10) Patent No.: US 6,676,196 B1
(45) Date of Patent: Jan. 13, 2004

(54) DUAL-PIVOT HINGE ASSEMBLY FOR VEHICLES

(75) Inventor: Eric J Smith, Clarkston, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/213,932

(22) Filed: Aug. 7, 2002

(51) Int. Cl.[7] .................................................. B60J 5/10
(52) U.S. Cl. ............................. 296/146.8; 296/146.12; 296/57.1
(58) Field of Search ...................... 296/51, 57.1, 146.8, 296/146.12; 16/308, 366, 367, 232

(56) References Cited

U.S. PATENT DOCUMENTS 3,122,775 A * 3/1964 Pulleyblank ................. 16/308
3,336,070 A * 8/1967 Jackson ..................... 296/57.1
3,454,299 A * 7/1969 Hewitt et al. .............. 296/57.1
3,476,375 A * 11/1969 Brasseur ...................... 16/308
3,567,274 A * 3/1971 Kaptur, Jr. et al. ........ 296/57.1
3,592,504 A * 7/1971 Sandor ....................... 296/57.1
4,076,301 A * 2/1978 Gergoe ....................... 296/57.1
4,143,904 A * 3/1979 Cooper et al. ............. 296/57.1
5,988,724 A * 11/1999 Wolda ........................ 296/57.1

* cited by examiner

*Primary Examiner*—Stephen T. Gordon
*Assistant Examiner*—Jason Morrow
(74) *Attorney, Agent, or Firm*—Laura C. Hargitt

(57) ABSTRACT

A dual-pivot hinge assembly for an endgate of a vehicle includes a body bracket for connection to a vehicle body of the vehicle. The dual-pivot hinge assembly also includes an intermediate bracket pivotally connected to the body bracket and for operative connection to the endgate and having a dual pivot to allow the endgate to pivot to a first open position and a second open position and to a closed position relative to the vehicle body. The dual-pivot hinge assembly includes a roller rotatably connected to the intermediate bracket to interface with a torque rod having a first portion for connection to the endgate and a second portion extending from the first portion and cooperating with the roller to counterbalance a weight of the endgate.

23 Claims, 7 Drawing Sheets

DUAL-PIVOT HINGE ASSEMBLY FOR VEHICLES

TECHNICAL FIELD

The present invention relates generally to hinges for vehicles and, more particularly, to a dual-pivot hinge assembly for a vehicle.

BACKGROUND OF THE INVENTION

It is known to provide vehicles such as a sport utility vehicle with a closure such as an endgate attached to a longitudinal end of the vehicle. The endgate is typically hinged to vehicle structure such as a vehicle body of the vehicle with at least one hinge to allow pivotal movement of the endgate. The endgate typically includes a latching mechanism to secure the endgate to the vehicle body when closed.

The endgate can rotate up and down about a horizontal axis, referred to as a "drop mode". During the drop mode, a torque rod counter-balances the weight of the endgate to reduce the amount of effort that the user must use to lower or raise the endgate. Typically, there is a link rod assembly that attaches to the vehicle body and interfaces with the torque rod. During vehicle assembly, the assembly plant connects the torque rod to the link rod assembly and then temporarily attaches it to the vehicle body before the endgate is loaded to the vehicle. This may result in a no-build condition because the link rod assembly and torque rod may obstruct the loading of the endgate to the vehicle body.

Therefore, it is desirable to eliminate the link rod assembly for an endgate of a vehicle. It is also desirable to reduce parts for an endgate of a vehicle such as a sport utility vehicle. It is further desirable to simplify the assembly process for an endgate on a vehicle such as a sport utility vehicle. Thus, there is a need in the art to provide a dual-pivot hinge assembly for a vehicle that meets these desires.

SUMMARY OF THE INVENTION

It is, therefore, one object of the present invention to provide a new dual-pivot hinge assembly for a vehicle.

It is another object of the present invention to provide a dual-pivot hinge assembly for a vehicle that eliminates a link rod assembly and simplifies assembly of the endgate to the vehicle.

It is yet another object of the present invention to provide a dual-pivot hinge assembly for a vehicle that incorporates a roller for a torque rod.

To achieve the foregoing objects, the present invention is a dual-pivot hinge assembly for an endgate of a vehicle. The dual-pivot hinge assembly includes a body bracket for connection to a vehicle body of the vehicle. The dual-pivot hinge assembly also includes a universal bracket pivotally connected to the body bracket and for operative connection to the endgate and having a dual pivot to allow the endgate to pivot to a first open position and a second open position and to a closed position relative to the vehicle body. The dual-pivot hinge assembly includes a roller rotatably connected to the universal bracket to interface with a torque rod having a first portion for connection to the endgate and a second portion extending from the first portion and cooperating with the roller to counterbalance a weight of the endgate.

One advantage of the present invention is that a new dual-pivot hinge assembly is provided for a vehicle. Another advantage of the present invention is that the dual-pivot hinge assembly incorporates a roller feature to eliminate a link rod assembly for the torque rod. Yet another advantage of the present invention is that the dual-pivot hinge assembly incorporates a roller feature to reduce parts. Still another advantage of the present invention is that the dual-pivot hinge assembly incorporates a roller feature to simplify the assembly process by eliminating an attachment of a link rod assembly. A further advantage of the present invention is that the dual-pivot hinge assembly incorporates a roller feature and saves the cost of purchasing and installing a link rod assembly. Yet a further advantage of the present invention is that the dual-pivot hinge assembly incorporates a roller feature attached to a universal bracket, which rotates about a vertical hinge axis so it does not inhibit a swing mode of the endgate.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
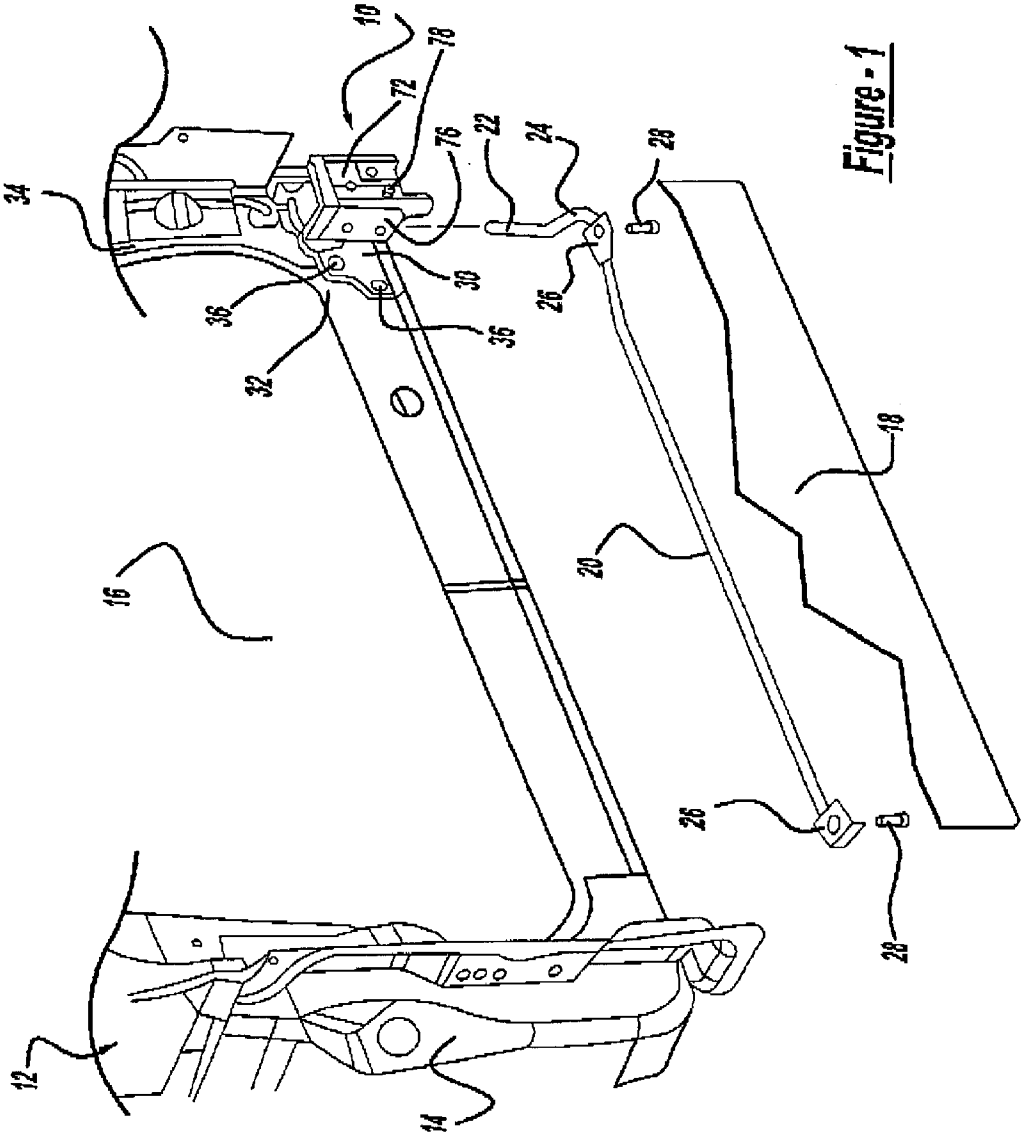
FIG. 1 is a perspective view of a dual-pivot hinge assembly, according to the present invention, illustrated in operational relationship with a vehicle.
Figure 2:
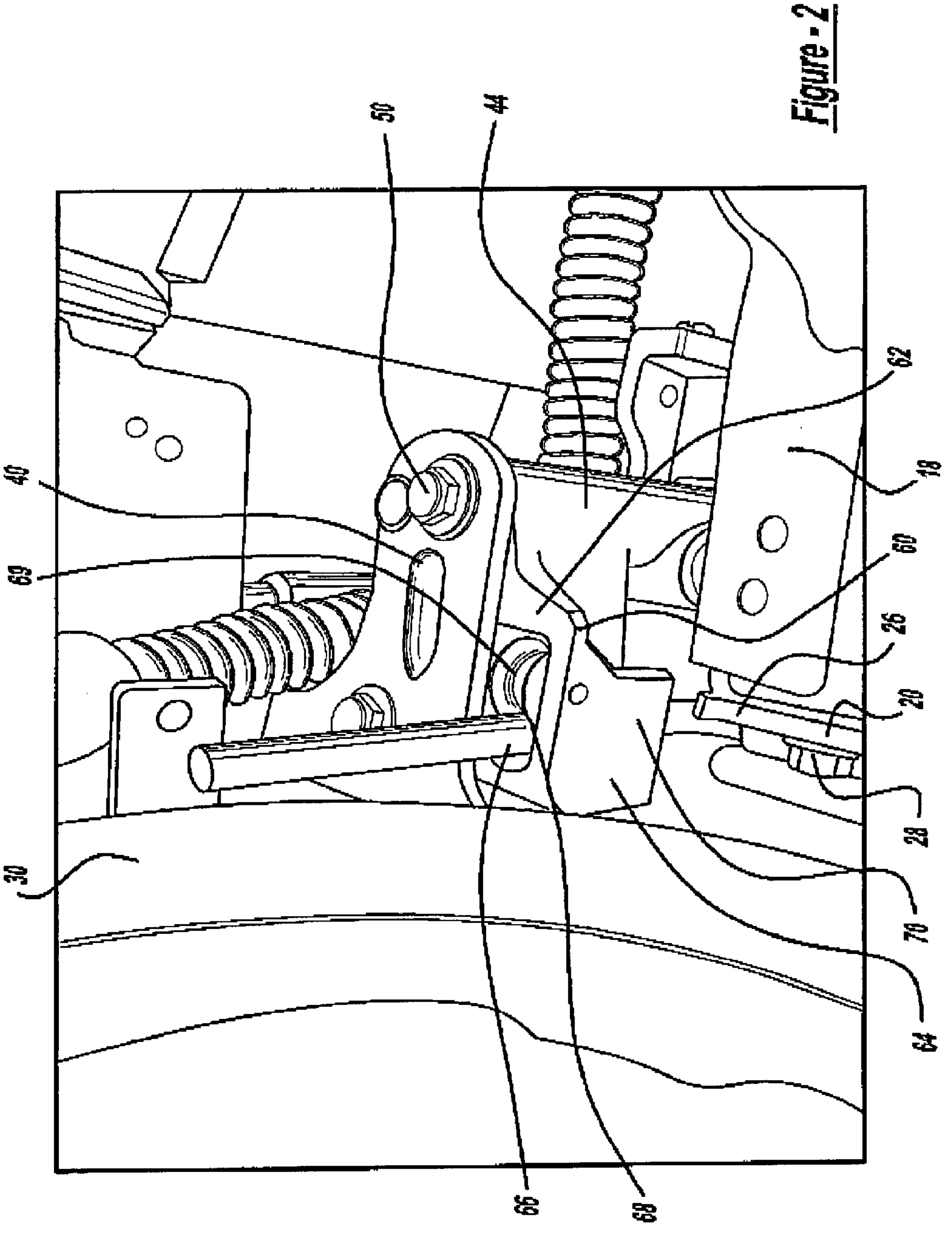
FIG. 2 is an enlarged perspective view of the dual-pivot hinge assembly of FIG. 1.

Referring to the drawings and in particular FIGS. 1 and 2, one embodiment of a dual-pivot hinge assembly 10, according to the present invention, is shown for a vehicle, such as a sport utility type motor vehicle, generally indicated at 12. The vehicle 12 includes vehicle structure such as a vehicle body 14 having an opening 16 at a longitudinal rear end thereof. The vehicle 12 also includes an openable member such as an endgate 18 (partially shown) pivotally attached to one side of the vehicle body 14 by the dual-pivot hinge assembly 10 to open and close the opening 16. It should be appreciated that only one dual-pivot hinge assembly 10 is needed for the endgate 18.

The vehicle 12 includes a torque rod 20 interconnecting the dual-pivot hinge assembly 10 and the endgate 18 to assist an operator in raising and lowering the endgate 18. The torque rod 20 extends laterally and is generally circular in cross-sectional shape. The torque rod 20 has an arm portion 22 at one end extending generally perpendicular to a laterally extending remainder thereof. The arm portion 22 may include a kink portion 24 extending laterally outward for a function to be described. The torque rod 20 is made of a spring-like material, preferably metal such as steel.

The vehicle 12 includes at least one, preferably a pair of laterally spaced brackets 26 connected to the torque rod 20 for connection to a bottom of the endgate 18. The vehicle 12 further includes at least one, preferably a plurality of fasteners 28 to extend through the brackets 26 and secure the torque rod 20 to the bottom of the endgate 18. It should be appreciated that, except for the dual-pivot hinge assembly 10, the vehicle 12 is conventional and known in the art.

Referring to FIGS. 1 through 7, the dual-pivot hinge assembly 10 includes a body bracket 30 connected to a body mount surface 32 of a rear pillar 34 of the vehicle body 14 by suitable means such as fasteners 36 extending through apertures 38 in the body bracket 30. The body bracket 30 has an upper flange 40 and a lower flange 42 being vertically spaced and extending longitudinally outward for a function to be described. The body bracket 30 is made of a rigid material, preferably a metal material such as steel.

The dual-pivot hinge assembly 10 also includes a universal bracket 44 disposed between the flanges 40,42 of the body bracket 30. The universal bracket 44 has a body portion 46 that is generally cylindrical in shape and has a generally circular cross-sectional shape. The body portion 46 has a vertical axis 48 for rotation thereabout. The body portion 46 is connected to the flanges 40,42 by suitable means such as fasteners 50 extending through apertures 52 in the flanges 40,42 to allow rotation of the body portion 46 about the vertical axis 48. It should be appreciated that the body bracket 30 is fixed or stationary and the body portion 46 rotates relative thereto.

The universal bracket 44 has an endgate portion 54 extending laterally and generally perpendicular from the body portion 46. The endgate portion 54 is generally cylindrical in shape and has a generally circular cross-sectional shape. The endgate portion 54 has a horizontal axis 56 for rotation thereabout.

The universal bracket 44 also has a hinge arm 60 extending longitudinally and laterally from the body portion 46. The hinge arm 60 has a top wall 62 that is generally planar and rectangular in shape. The hinge arm 60 has a pair of laterally spaced side walls 64 extending generally vertically and perpendicularly from the top wall 62. The top wall 62 has an elongated aperture 66 extending therethrough. The universal bracket 44 is made of a rigid material, preferably a metal material such as aluminum. It should be appreciated that the universal bracket 44 is a monolithic structure being integral, unitary, and one-piece.

The dual-pivot hinge assembly 10 includes a roller 68 disposed in the aperture 66 in the top wall 62 of the universal bracket 44. The roller 68 is generally circular in shape and has a groove or channel 69 circumferentially thereabout to receive the arm portion 22 of the torque rod 20. The roller 68 is rotatably secured to the hinge arm 60 by suitable means such as a pin 70 extending through the roller 68 and the side walls 64 of the hinge arm 60. The roller 68 is made of a rigid material, preferably a metal material such as steel. It should be appreciated that the torque rod 20 cooperates with the roller 68 to rotate the roller 68 as the arm portion 22 of the torque rod 20 moves up and down.

Figure 5:
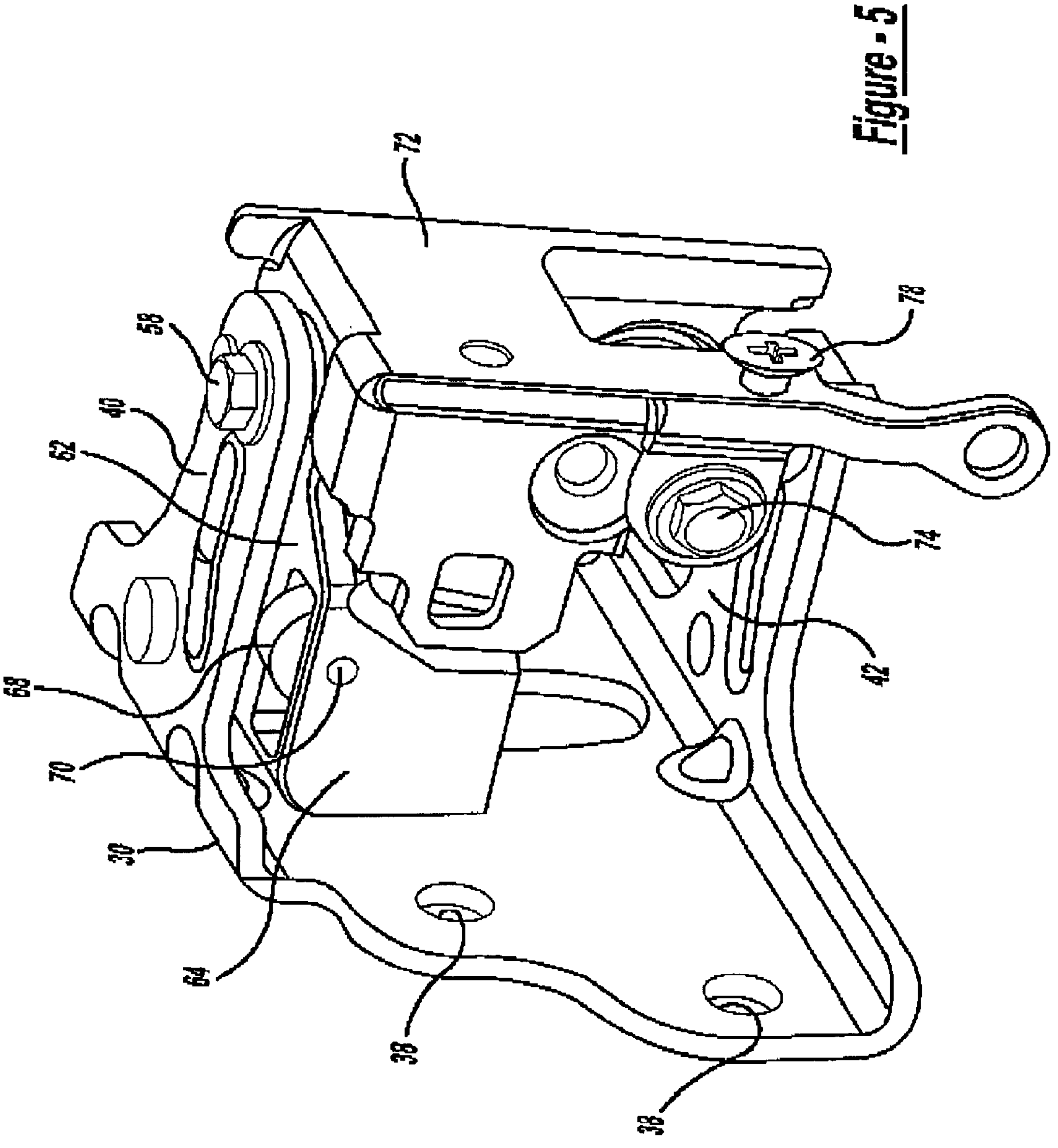
FIG. 5 is a perspective view of the dual-pivot hinge assembly of FIG. 1 with a torque rod and gate bracket side removed and illustrating a closed drop mode operational position.

Referring to FIGS. 1 and 5, the dual-pivot hinge assembly 10 also includes an intermediate bracket 72 pivotally connected to the endgate portion 54 of the universal bracket 44 by suitable means such as fasteners 74. The intermediate bracket 72 is generally "U" shaped and made of a rigid material, preferably a metal material. The fasteners 74 extend through apertures 58 in the endgate portion 54 to allow rotation of the endgate 18 about the horizontal axis 56. It should be appreciated that the endgate 18 rotates relative to the endgate portion 54.

Figure 6:
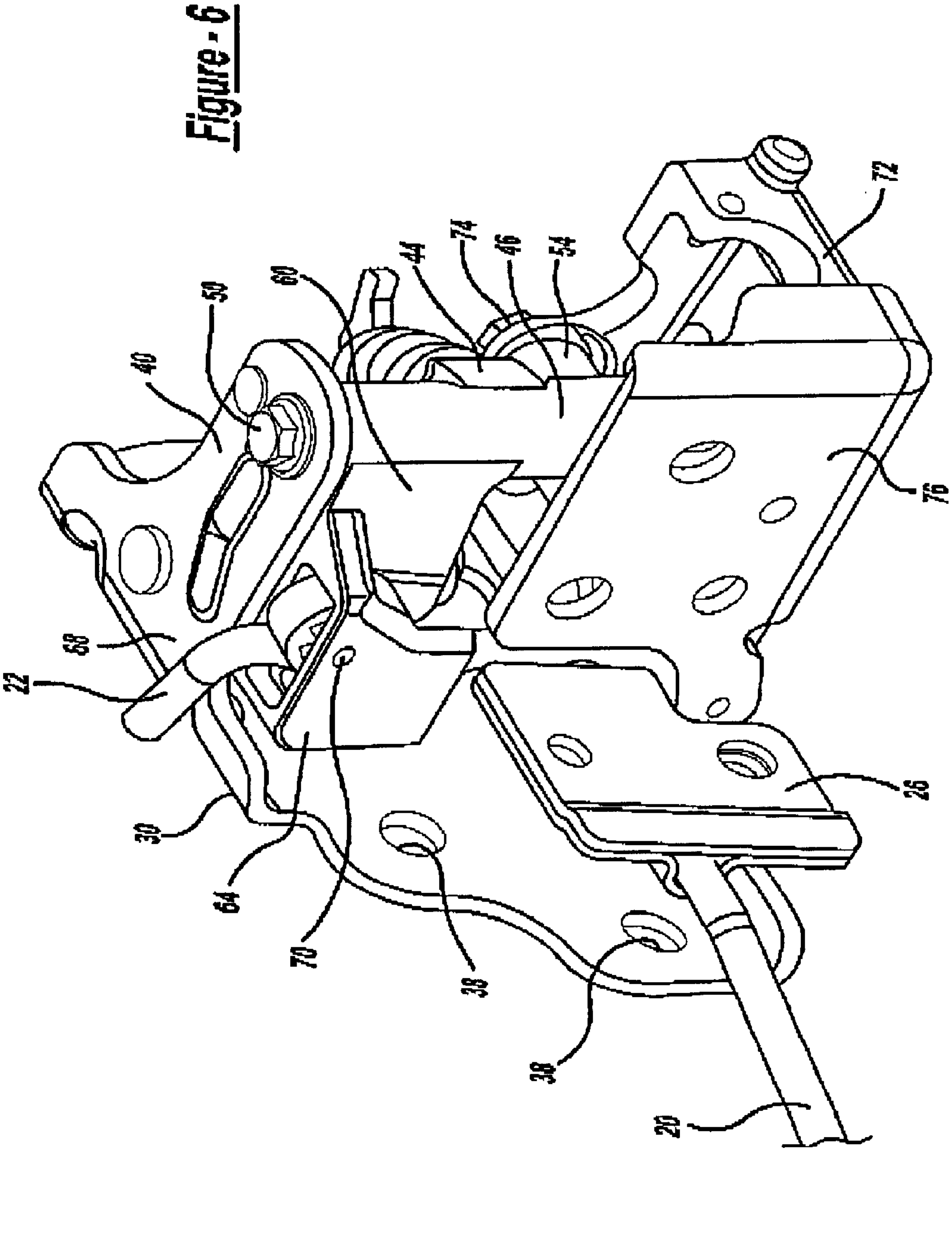
FIG. 6 is a view similar to FIG. 5 with the torque rod and gate side bracket added and illustrating an open drop mode operational position.

Referring to FIGS. 1 and 6, the dual-pivot hinge assembly 10 also includes a gate side bracket 76 connected to the intermediate bracket 72 and the endgate 18 by suitable means such as fasteners 78. The gate side bracket 76 is generally "L" shaped and made of a rigid material, preferably a metal material.

Figure 3:
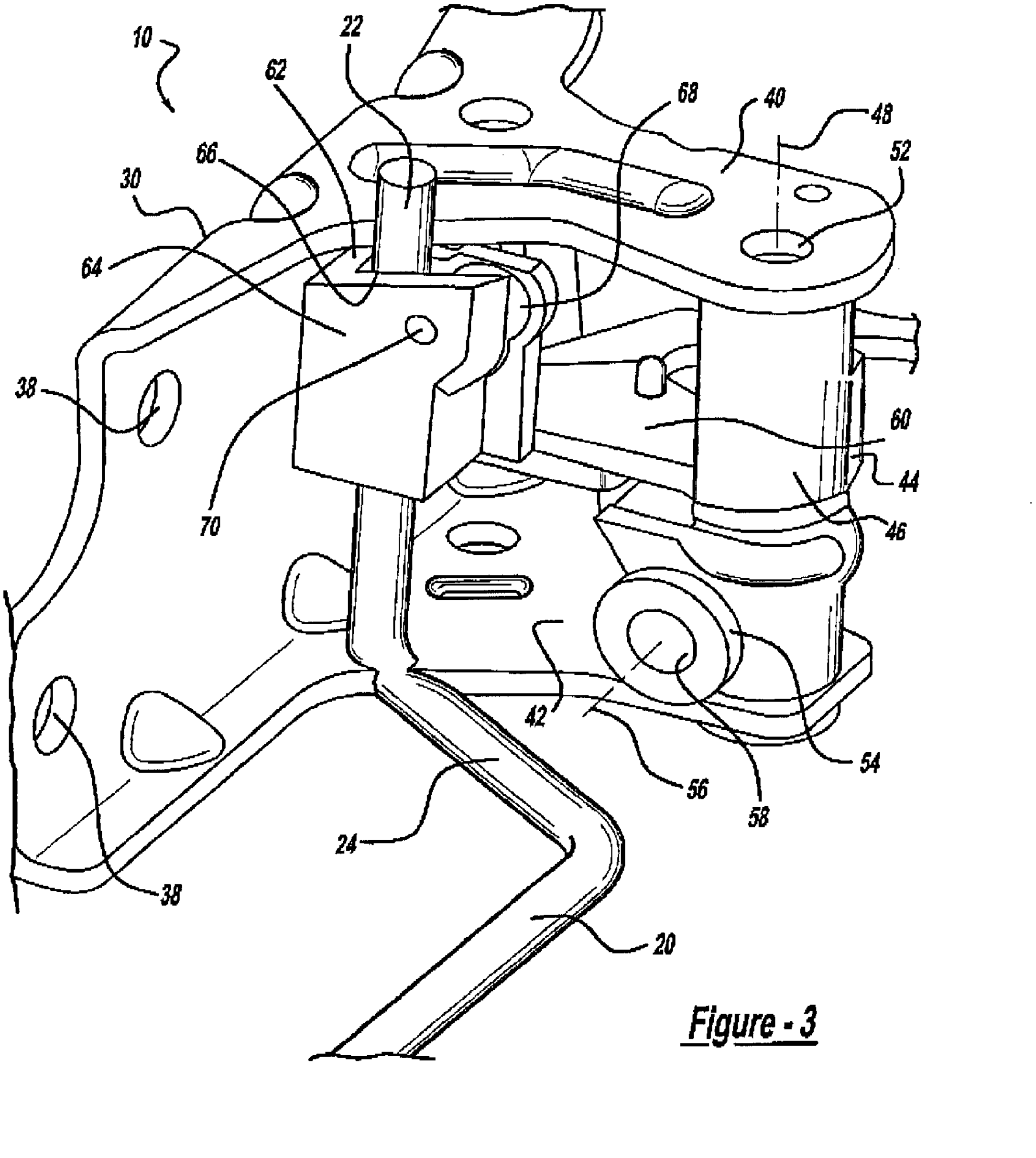
FIG. 3 is a perspective view of the dual-pivot hinge assembly of FIG. 1 illustrating a first operational position.
Figure 4:
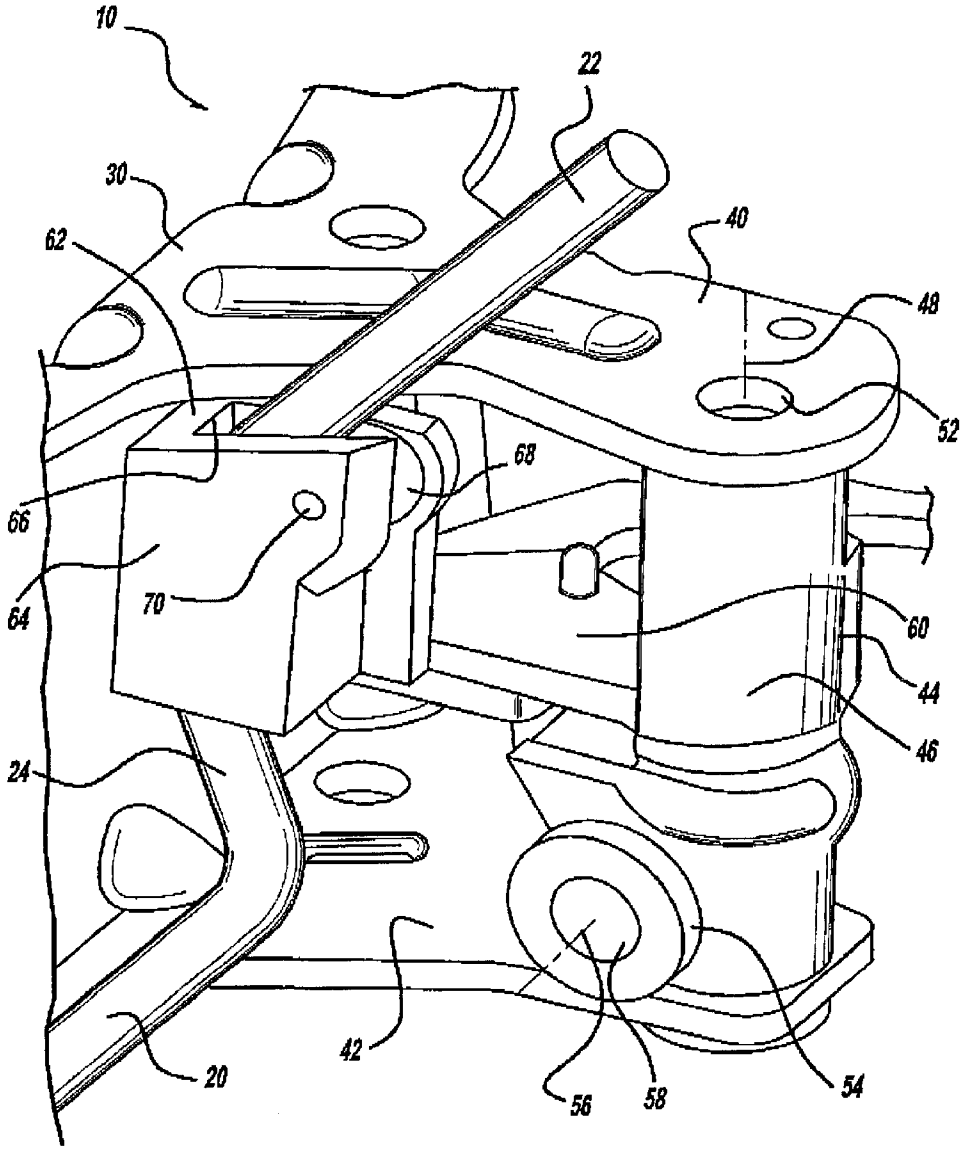
FIG. 4 is a view similar to FIG. 3 illustrating a second operational position.
Figure 7:
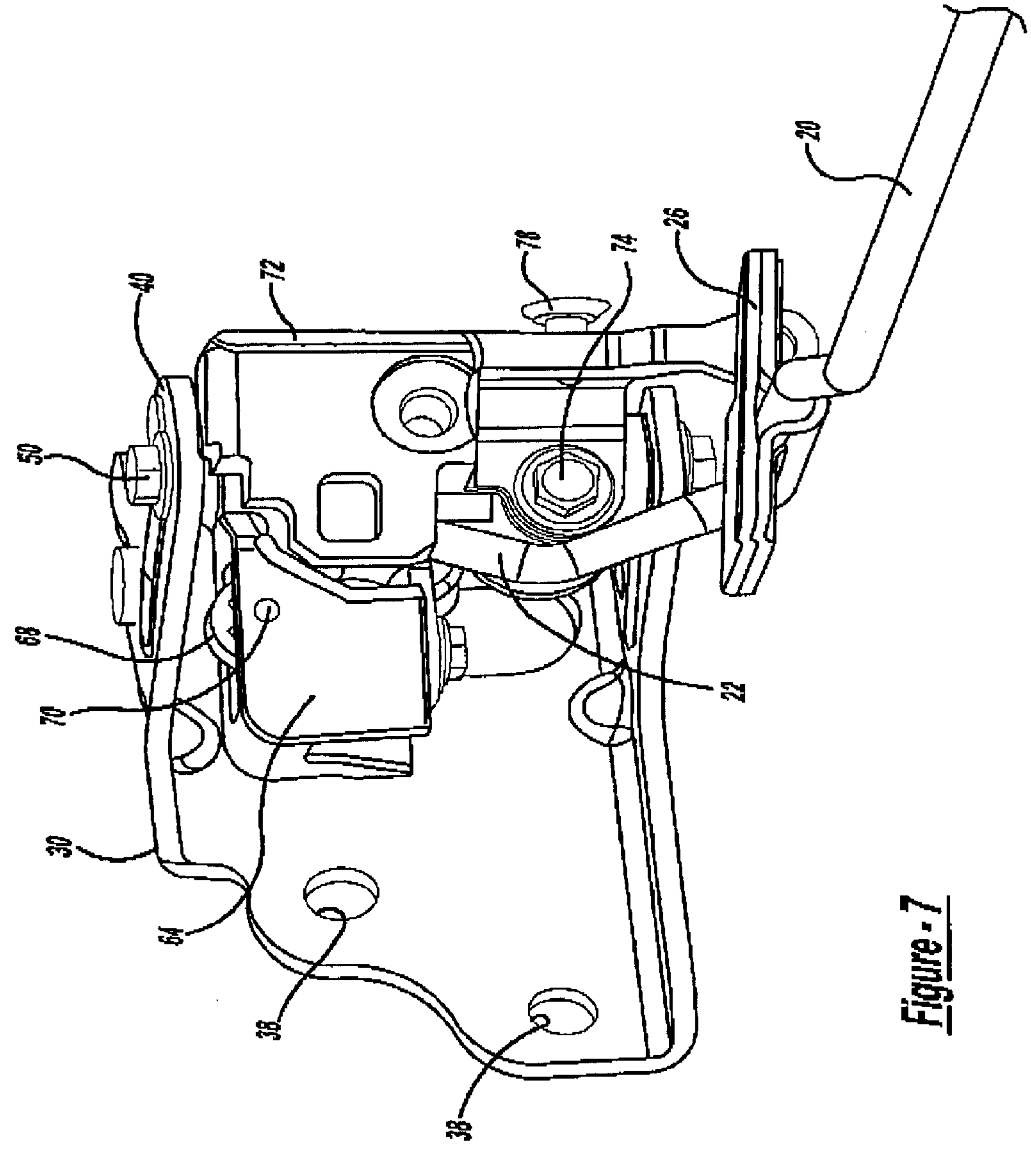
FIG. 7 is a view similar to FIG. 5 with the torque rod and gate bracket side removed and illustrating an open swing mode operational position.

In operation, the endgate 18 can either rotate sideways about the vertical axis 48, referred to as a "swing mode", as illustrated in FIG. 7 or up and down about the horizontal axis 56, referred to as a "drop mode", as illustrated in FIGS. 5 and 6. When the endgate 18 is in a closed position, the torque rod 20 is in a closed position as illustrated in FIG. 3. It should be appreciated that pivot control is accomplished with torque rod 20 and roller 68 rigidly attached to the brackets 44 and 48.

To open the endgate 18, a handle (not shown) upon the endgate 18 is actuated to release a latch (not shown) from a latch member (not shown) and the endgate 18 is pivoted about either the vertical axis 48 or the horizontal axis 56. During the drop mode, the torque rod 20 counter-balances the weight of the endgate 18 to reduce the amount of effort that a user must use to lower or raise the endgate 18. The arm portion 22 of the torque rod 20 contacts the roller 68 as the endgate 18 is dropped or opened and remains in contact to the fully dropped position illustrated in FIGS. 4 and 6. As the endgate 18 rotates about the horizontal axis 56, the lower part or remainder of the torque rod 20 moves with the endgate 18, but the arm portion 22 is prevented from rotating, which creates the torque to counter-balance the weight of the endgate 18. It should be appreciated that the arm portion 22 of the torque rod 20 can move up or down as the roller 68 rotates about its axis or the pin 70. It should also be appreciated that the arm portion 22 of the torque rod 20 is free to move up or down to prevent binding, but it must not be allowed to rotate with the endgate 18 about the horizontal axis 56.

During the swing mode, the roller 68, which is attached to the hinge arm 60 of the universal bracket 44, rotates with the body portion 46 about the vertical axis 48 as illustrated in FIG. 7. As a result, the roller 68 does not inhibit the swing mode of the endgate 18. It should be appreciated that the arm portion 22 of the torque rod 20 remains in the same relative position to the roller 68 as the endgate 18 is swung or opened.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A dual-pivot hinge assembly for an endgate of a vehicle comprising:

a body bracket for connection to a vehicle body of the vehicle;

a universal bracket pivotally connected to said body bracket and for operative connection to the endgate and having a dual pivot to allow the endgate to pivot to a first open position and a second open position and to a closed position relative to the vehicle body; and a roller rotatably connected to said universal bracket to interface with a torque rod having a first portion for connection to the endgate and a second portion extending from the first portion and cooperating with said roller to counterbalance a weight of the endgate.

2. A dual-pivot hinge assembly as set forth in claim 1 wherein said universal bracket includes a body portion extending generally vertically and forming a vertical axis.

3. A dual-pivot hinge assembly as set forth in claim 2 wherein said body bracket includes an upper flange and a lower flange spaced vertically and extending longitudinally, said body portion being disposed between said upper flange and said lower flange.

4. A dual-pivot hinge assembly as set forth in claim 3 including at least one fastener for pivotally connecting said body portion to said upper flange and said lower flange for rotation about said vertical axis.

5. A dual-pivot hinge assembly as set forth in claim 2 wherein said universal bracket includes a hinge arm extending from said body portion and connected to said roller.

6. A dual-pivot hinge assembly as set forth in claim 5 wherein said hinge arm includes a top wall and a pair of side walls spaced laterally and extending generally perpendicular from said side walls, said top wall having an aperture extending therethrough to receive said roller.

7. A dual-pivot hinge assembly as set forth in claim 6 including a pin extending through said roller and said side walls to rotatably connect said roller to said side walls.

8. A dual-pivot hinge assembly as set forth in claim 2 wherein said universal bracket includes an endgate portion extending generally horizontally from said body portion and forming a horizontal axis.

9. A dual-pivot hinge assembly as set forth in claim 8 including an intermediate bracket pivotally connected to said endgate portion for rotation about said horizontal axis.

10. A dual-pivot hinge assembly as set forth in claim 9 including a gate side bracket connected to said intermediate bracket and for connection to the endgate.

11. A dual-pivot hinge assembly as set forth in claim 1 wherein said first portion of said torque rod extends laterally and said second portion extends generally perpendicular from said first portion.

12. A vehicle comprising:

a vehicle body having a rear end with an opening;

an endgate disposed in said opening and operatively cooperating with said vehicle body to open and close said opening;

a dual-pivot hinge assembly connected to said endgate and to said vehicle body and having a dual pivot to allow said endgate to pivot to a first open position and a second open position and to a closed position relative to said door opening, said dual-pivot hinge assembly including a roller rotatably connected thereto; and a torque rod having a first portion connected to said endgate and a second portion extending from said first portion and cooperating with said roller to counterbalance a weight of said endgate.

13. A vehicle as set forth in claim 12 wherein said dual-pivot hinge assembly includes a body bracket connected to said vehicle body.

14. A vehicle as set forth in claim 13 wherein said dual-pivot hinge assembly includes a universal bracket pivotally connected to said body bracket and having said dual pivot.

15. A vehicle as set forth in claim 14 wherein said universal bracket includes a body portion extending generally vertically and forming a vertical axis.

16. A vehicle as set forth in claim 15 wherein said body bracket includes an upper flange and a lower flange spaced vertically and extending longitudinally, said body portion being disposed between said upper flange and said lower flange.

17. A vehicle as set forth in claim 15 wherein said universal bracket includes a hinge arm extending from said body portion and connected to said roller.

18. A vehicle as set forth in claim 17 wherein said hinge arm includes a top wall and a pair of side walls spaced laterally and extending generally perpendicular from said side walls, said top wall having an aperture extending therethrough to receive said roller.

19. A vehicle as set forth in claim 15 wherein said universal bracket includes an endgate portion extending generally horizontally from said body portion and forming a horizontal axis.

20. A vehicle as set forth in claim 19 including an intermediate bracket pivotally connected to said endgate portion for rotation about said horizontal axis.

21. A vehicle as set forth in claim 20 including a gate side bracket connected to said intermediate bracket and said endgate.

22. A vehicle as set forth in claim 12 wherein said first portion of said torque rod extends laterally and said second portion extends generally perpendicular from said first portion.

23. A vehicle comprising:

a vehicle body having a rear end with an opening;

an endgate disposed in said opening and operatively cooperating with said vehicle body to open and close said opening;

a dual-pivot hinge assembly comprising a body bracket connected to said vehicle body, a universal bracket pivotally connected to said body bracket and having a dual pivot to allow said endgate to pivot to a first open position and a second open position and to a closed position relative to said vehicle body, a roller rotatably connected to said universal bracket, an intermediate bracket pivotally connected to said universal bracket, and a gate side bracket connected to said intermediate bracket and said endgate; and a torque rod having a first portion connected to said endgate and a second portion extending from said first portion and cooperating with said roller to counterbalance a weight of said endgate.

* * * * *